United States Patent
Hua et al.

(10) Patent No.: US 7,127,120 B2
(45) Date of Patent: Oct. 24, 2006

(54) SYSTEMS AND METHODS FOR AUTOMATICALLY EDITING A VIDEO

(75) Inventors: Xian-Sheng Hua, Beijing (CN); Lie Lu, Beijing (CN); Yu-Fei Ma, Beijing (CN); Mingjing Li, Beijing (CN); Hong-Jiang Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 870 days.

(21) Appl. No.: 10/286,348

(22) Filed: Nov. 1, 2002

(65) Prior Publication Data

US 2004/0085341 A1  May 6, 2004

(51) Int. Cl.
*G06K 9/40* (2006.01)

(52) U.S. Cl. .................. 382/254; 382/190; 382/282; 348/97; 348/616

(58) Field of Classification Search ........... 382/171, 382/190, 282, 284; 348/29, 616
See application file for complete search history.

(56) References Cited

U.S. PATENT DOCUMENTS

| | | | |
|---|---|---|---|
| 5,442,633 A | 8/1995 | Perkins et al. | |
| 5,530,963 A | 6/1996 | Moore et al. | |
| 5,625,877 A | 4/1997 | Dunn et al. | |
| 5,642,294 A | 6/1997 | Taniguchi et al. | |
| 5,659,685 A | 8/1997 | Williams et al. | |
| 5,745,190 A | 4/1998 | Ioka | |
| 5,751,378 A | 5/1998 | Chen et al. | |
| 5,774,593 A | 6/1998 | Zick et al. | |
| 5,801,765 A | 9/1998 | Gotoh et al. | |
| 5,835,163 A | 11/1998 | Liou et al. | |
| 5,884,056 A | 3/1999 | Steele | |
| 5,900,919 A | 5/1999 | Chen et al. | |
| 5,911,008 A | 6/1999 | Niikura et al. | |
| 5,920,360 A | 7/1999 | Coleman, Jr. | |
| 5,959,697 A | 9/1999 | Coleman, Jr. | |
| 5,983,273 A | 11/1999 | White et al. | |
| 5,990,980 A | 11/1999 | Golin | |
| 5,995,095 A | 11/1999 | Ratakonda | |
| 6,166,735 A | 12/2000 | Dom et al. | |
| 6,462,754 B1 | 10/2002 | Chakraborty et al. | |
| 6,466,702 B1 | 10/2002 | Atkins et al. | |
| 6,643,665 B1 | 11/2003 | Kimbell et al. | |
| 2002/0157116 A1 | 10/2002 | Jasinschi | |
| 2002/0166123 A1 | 11/2002 | Schrader et al. | |

(Continued)

FOREIGN PATENT DOCUMENTS

EP  0597450  5/1994

(Continued)

OTHER PUBLICATIONS

Zhang et al., "A Hierarchical Organization Scheme for Video Data" Pattern Recognition, Elsevier, Kidlington, GB, vol. 35 No. 11, Nov. 2002, pp. 2381-2387.

(Continued)

*Primary Examiner*—Samir A. Ahmed
*Assistant Examiner*—Yosef Kassa
(74) *Attorney, Agent, or Firm*—Lee & Hayes, PLLC

(57) ABSTRACT

Systems and methods to automatically edit a video to generate a video summary are described. In one aspect, sub-shots are extracted from the video. Importance measures are calculated for at least a portion of the extracted sub-shots. Respective relative distributions for sub-shots having relatively higher importance measures as compared to importance measures of other sub-shots are determined. Based on the determined relative distributions, sub-shots that do not exhibit a uniform distribution with respect to other sub-shots in the particular ones are dropped. The remaining sub-shots are connected with respective transitions to generate the video summary.

54 Claims, 6 Drawing Sheets

U.S. PATENT DOCUMENTS

| | | | |
|---|---|---|---|
| 2003/0152363 | A1 | 8/2003 | Jeannin et al. |
| 2003/0237053 | A1 | 12/2003 | Chen et al. |
| 2004/0040041 | A1 | 2/2004 | Crawford |
| 2004/0078357 | A1 | 4/2004 | LaChapelle et al. |
| 2004/0078382 | A1 | 4/2004 | Mercer et al. |
| 2004/0078383 | A1 | 4/2004 | Mercer et al. |

FOREIGN PATENT DOCUMENTS

| | | |
|---|---|---|
| EP | 1 168 840 A2 | 1/2002 |
| EP | 1 213 915 A2 | 6/2002 |
| GB | 2 356 080 A | 5/2001 |

OTHER PUBLICATIONS

"Advanced Digital Video Storage and On-line Retrieval System", Advisor Project, Jun. 30, 2002, retrieved from the Internet: http://advisor.matrasi-tls.fr/DUP_workshop_sheet.pdf.

Bertini et al., "Indexing for Resue of TV News Shots" Pattern Recognition, Elsevier, Kidlington, GB, vol. 35, No. 3, Mar. 2002, pp. 581-591.

Lee et al., "Automatic Video Parsing Using Shot Boundary Detection and Camera Operation Analysis" Pattern Recognition, Elsevier, Kidlington, GB, vol. 34, No. 3, Mar. 2001, pp. 711-719.

Fan, et al., "Visual Attention Based Image Browsing on Mobile Devices" 4 pages.

Ahmad, Subutai; "VISIT: A Neural Model of Covert Visual Attention" Advances in Neural Information Processing Systems, v. 4, 1991, pp. 420-427.

Baluja et al.; "Expectation-Based Selective Attention for Visual Monitoring and Control of a Robot Vehicle" Robotics and Autonomous Systems, v. 22 No. 3-4, Dec. 1997, pp. 329-344.

Chen et al.; "A Visual Attention Model for Adapting Images on Small Displays" ACM Multimedia Systems Journal, 2003.

Cherry Steven M.; "Pesky Home Networks Trouble cable Behemoths" IEEE Spectrum, Apr. 2002, pp. 60-61.

Deng et al.;"Peer Group Filtering and Perceptual Color Image Quantization" Proceedings of IEEE International Symposium on Circuits and Systems, vol. 4, 1999, pp. 21-24.

Gamaz et al.; "Robust scene-change detection in MPEG compressed domain" Electrical & Computer Engineering, 1998, pp. 95-99.

Gu et al.; "Dissolve Detection in MPEG Compressed Video" IEEE, 1997, pp. 1692-1696.

Hargrove, Thomas; "Logo Detection in Digital Video" Math 100, Mar. 6, 2001 http://toonarchive.com/logo-detection/, 9 pages.

Held, Gibert; "Focus on Agere System's Orinoco PC Card" International Journal of Network Management, Jan. 2002, pp. 187-193.

http://www.fatalfx.com/nomad/ "NOMAD (No More Advertising)" Feb. 17, 2003, 4 pages.

U.S. Appl. No. 10/371,125, filed Feb. 20, 2003; Inventors: Wei-Ying Ma et al., Entitled "Systems and Methods for Enhanced Image Adaptation".

Heng et al.; "Post Shot Boundary Detection Technique: Flashlight Scene Determination" University of Western Australia, 1999, pp. 447-450.

Jha, Uma S.; "Wireless Landscape-Need for Seamless Connectivity" Wireless Personal Communications 2002 pp. 275-283.

Jing et al.; "An Effective Region-Based Image Retrieval Framework" From ACM Multimedia, 2002, 28 pages.

Lelescu et al.; "Real-time Scene Change Detection on Compressed Multimedia Bitstream Based on Statistical Sequential Analysis" IEEE, 2000, pp. 1141-1144.

Li et al.; "Statistical Learning of Multi-View Face Detection" Proceedings of ECCV, 2002, 25 pages.

Lienhart, R. et al.; "On the Detection and Recognition of Television Commercials" University of Mannheim, 17 pages.

Lu, Lie et al.; "A Robust Audio Classification and Segmentation Method" Microsoft Research, China, 9 pages.

Lu, Lie et al.; "Content Analysis for Audio Classification and Segmentation" IEEE Transactions on Speech and Audio Processing, vol. 10 No. 7, Oct. 2002, pp. 504-516.

Lu, Lie et al.; "Content-Based Audio Segmentation Using Support Vector Machines" IEEE, 2001, pp. 956-959.

Ma et al.; "A User Attention Model for Video Summarization" Proceedings of ICIP, 2002.

Milanese R. et al.; "Attentive Mechanisms for Dynamic and Static Scene Analysis" Optical Engineering, v34 No. 8, Aug. 1995, pp. 2428-2434.

Niebur, E. et al.; "Computational Architectures for Attention" The Attentive Brain, Chapter 9, 1998, pp. 163-186.

O'Toole; "An MPEG-1 Shot Boundary Detector Using XIL Colour Histograms" Dublin City University, 1998, pp. 1-7.

Sadlier, David A.; "Automatic TV Advertisement Detection from MPEG Bitstream" Centre for Digital Video Processing/Research Institute for Network & Communication Eng., Dublin City University, 12 pages.

Sahoo P.K. et al.; "Threshold Selection Using a Minimal Histogram Entropy Difference" Optical Engineering, v36 No. 7, Jul. 1997, pp. 1976-1981.

Sanchez, Juan Maria; "AudiCom: A Video Analysis System for Auditing Commercial Broadcasts" Computer Vision Center Departament d'Informatica Universitat Autonoma de Barcelona, 5 pages.

Tsotsos J. K. et al.; "Modeling Visual Attention Via Selective Tuning" Artificial Intelligence v78 1995 pp. 507-545.

Wolfe J. M. et al.; "Deploying Visual Attention: The Guided Search Model" AI and the Eye, Chapter 4, 1990, pp. 79-103.

Yeo et al.; "Rapid Scene Analysis on Compressed Video" IEEE, 1995, pp. 533-544.

Yusoff et al.; "Video Shot Cut Detection Using Adaptive Thresholding" University of Surrey, 2000, pp. 1-10.

Zabih, Ramin; "A Feature-Based Algorithm for Detecting and Classifying Scene Breaks" Computer Science Department, Cornell University, 16 pages.

Zadeh L. A.; "Probability Measures of Fuzzy Events" Journal of Mathematical Analysis and Applications, 23, 1968, pp. 421-427.

Divakaran, A., Radhakrishnan, R., Peker, K. A.; "Video Summarization using Descriptors of Motion Activity: A Motion Activity Based Approach to Key-Frame Extraction from Video Shots" Journal of Electronic Imagin, SPIE + IS&T vol. 10, No. 4, Oct. 2001 pp. 909-916.

U.S. Appl. No. 10/285,933, filed Nov. 1, 2002, inventors Yu-Fei Ma et al., entitled "Systems and Methods for Generating a Motion Attention Model,".

Lee, Keansub et al., "Perception-Based Image Transcoding for Universal Multimedia Access," School of Electrical Engineering Korea University, Seoul, Korea, 2001 IEEE, pp. 475-478.

Christopoulos, Charilaos et al., "The JPEG2000 Still Image Coding System: An Overview," IEEE Transactions on Consumer Electronics, vol. 46, No. 4, pp. 1103-1127, Nov. 2000.

Chen, Jinlin et al., "Function-based Object Model Towards Website Adaptation," (2001) Proc. of the 10th Int. WWW Conf. pp. 1-21.

U.S. Appl. No. 10/179,161, filed Jun. 24, 2002, inventors Jin-Lin Chen & Wei-Ying Ma, entitled "Function-based Object Model for Web Page Display in a Mobile Device,".

U.S. Appl. No. 10/286,053, filed Nov. 1, 2002, inventors Yu-Fei Ma et al., entitled "Systems and Methods for Generating a Comprehensive User Attention Model,".

M.A. Smith & T. Kanade, "Video Skimming and Characterization through the Combination of Image and Language Understanding Techniques," Proc. of Computer Vision and Pattern Recognition, 1997 IEEE, pp. 775-781.

L. Itti & C. Koch, "Computational Modelling of Visual Attention," Nature Reviews/Neuroscience, vol. 2, Mar. 2001, pp. 1-11.

L. Itti, C. Koch & E. Niebur, "A Model of Saliency-based Visual Attention for Rapid Scene Analysis," IEEE Trans. on Pattern Analysis and Machine Intelligence, 1998, 5 pages.

L. Itti & C. Koch, "A Comparison of Feature Combination Strategies for Saliency-Based Visual Attention Systems," Proc. of SPIE Human Vision and Electronic Imaging IV (HVEI'99), San Jose, CA, vol. 3644, pp. 473-482, Jan. 1999.

Yu-Fei Ma & Hong-Jiang Zhang, "A New Perceived Motion Based Shot Content Representation," Microsoft Research China, 4 pages.

Yu-Fei Ma & Hong-Jiang Zhang, "A Model of Motion Attention for Video Skimming," Microsoft Research Asia, 4 pages.

Colin O'Toole et al., "Evaluation of Automatic Shot Boundary Detection on a Large Video Test Suite," School of Computer Applications & School of Electronic Engineering, Dublin City University, Glasnevin, Dublin, Ireland, Challenge of Image Retrieval, Newcastle, 1999, pp. 1-12.

T. Lin, H.J. Zhang, Q.Y. Shi, "Video Scene Extraction by Force Competition," IEEE Intl. Conference on Multimedia and Expo (ICME 001), Waseda University, Tokyo, Japan, Aug. 22-25, 2001, 4 pages.

FRAME DIFFERENT DATA
CURVE
300

SENTENCES IN THE AUDIO
CHANNEL
400

DETECTED STRONG BEATS AND
MOODS IN MUSIC
700

600

SYSTEMS AND METHODS FOR AUTOMATICALLY EDITING A VIDEO

RELATED APPLICATIONS

This patent application is related to:

U.S. patent application Ser. No. 09/882,787, titled "A Method and Apparatus for Shot Detection", filed on Jun. 14, 2001, commonly assigned herewith, and hereby incorporated by reference.

U.S. patent application Ser. No. 10/286,053, titled "Systems and Methods for Generating a Comprehensive User Attention Model", filed on Nov. 1, 2002, commonly assigned herewith, and hereby incorporated by reference.

TECHNICAL FIELD

The invention pertains to systems and methods that utilize video data. In particular, the invention pertains to automatically editing video data with or without respect to an input music file.

BACKGROUND

Camcorders are increasingly being used by professionals and amateurs alike to generate videos. However, once a video is made, individuals seldom have the opportunity to re-watch the videos or share them with friends. This is due, in part, to the amount of time that is typically required to view large amounts of unedited video data files. This leads to an urgent need for efficient and effective processing tools for summarizing videos.

Existing video summarization or skimming schemes might fit some users' needs to reduce the size and summarize video data. However, even when a computer is used to implement such traditional techniques, these techniques are typically substantially time consuming, labor intensive, and often require more video processing knowledge than is conveniently available to a non-professional camcorder user.

The following systems and methods address these and other limitations of existing video editing tools.

SUMMARY

Systems and methods to automatically edit a video are described. In one aspect, sub-shots are extracted from the video. Importance measures are calculated for at least a portion of the extracted sub-shots. Respective relative distributions for sub-shots having relatively higher importance measures as compared to importance measures of other sub-shots are determined. Based on the determined relative distributions, sub-shots that do not exhibit a uniform distribution with respect to other sub-shots in the particular ones are dropped. The remaining sub-shots, connected by respective shot transitions, comprise the video summary. An independent music source can also be added as incidental music by aligning the sub-shot boundaries with the music beats and matching sub-shot motion intensities with the music moods.

BRIEF DESCRIPTION OF THE DRAWINGS

The following detailed description is described with reference to the accompanying figures. In the figures, the left-most digit(s) of a reference number identifies the figure ("Fig.") in which the reference number first appears.

DETAILED DESCRIPTION

Overview

Figure 1:
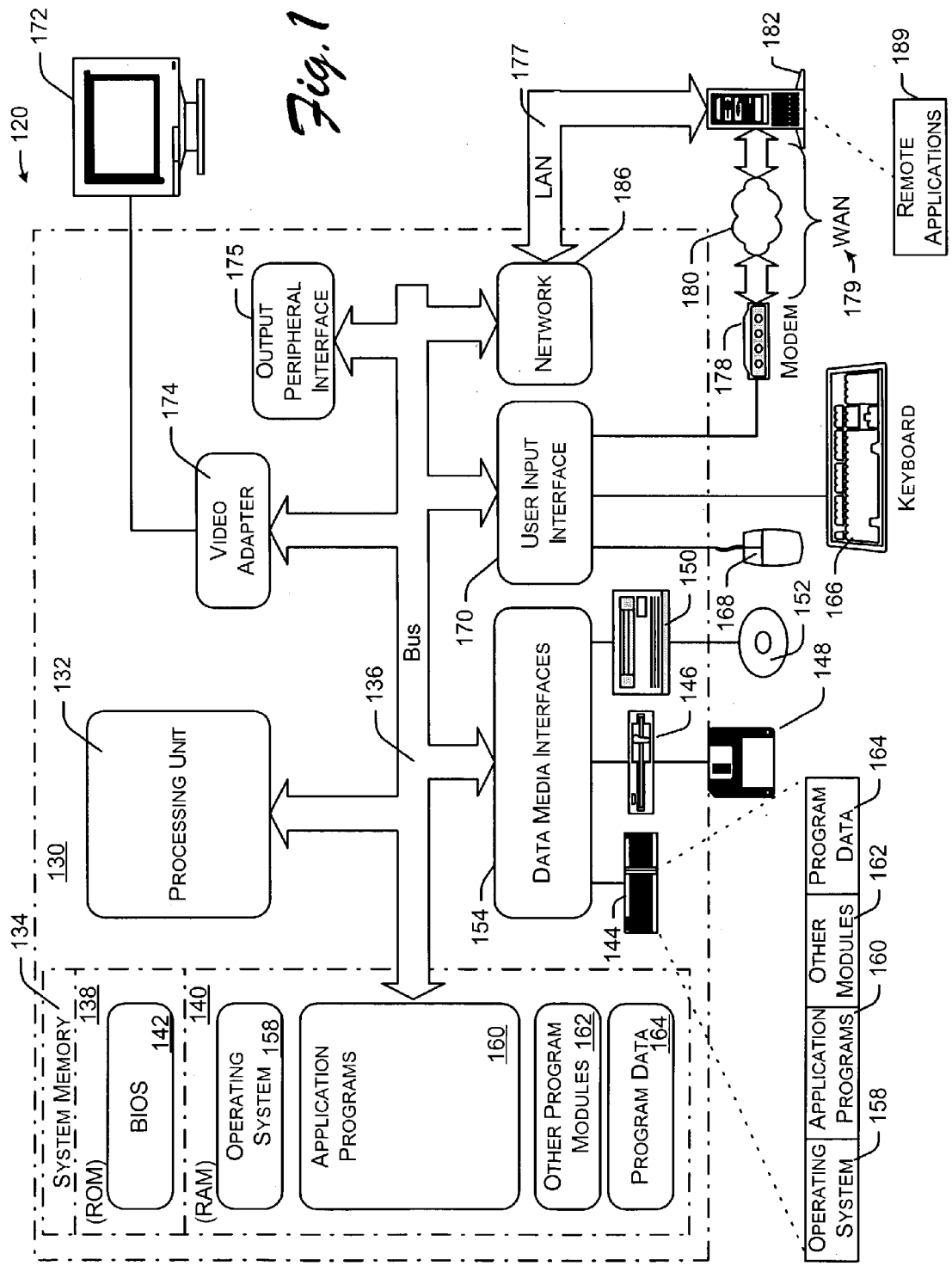
FIG. 1 is a block diagram of an exemplary computing environment within which systems and methods to automatically edit video data with respect to music may be implemented.

Systems and methods for automatically editing a video data sequence with or without respect to an independent music source are described. The inputs of this system are two media files: one video file and one music file. The video file consists of video and audio channels. Thus, there are actually three input data sequences: video and audio (from the video file), and the separate or independent music file. To automatically edit the video file with respect to the music, the video file is first hierarchically divided into scenes, shots, and sub-shots. Metadata features are then extracted from each sub-shot. As described below, such extracted sub-shot metadata may include any combination of motion intensity, camera motion pattern, color entropy information, and audio data (e.g., speech, non-speech, sentence boundaries from the audio channel of the video data, etc.).

Low quality frame sequences (e.g., those with poor color entropy, abnormal motion analysis results, etc.) are then discarded from the extracted video shots, sub-shots, and/or scenes. An importance measure of each remaining sub-shot is then computed based on the extracted metadata. A summary of the input video data sequence is created from the extracted information based on the computed importance measures. The summary is generated such that it will incorporate important concepts from the input video data sequence, and filter out lower importance and quality aspects of the input sequence.

The input music file is segmented into clips or "sub-musics" according to detected locations of strong beats or rhythms. Respective mood values are determined for the sub-musics. Certain ones of the sub-shots that substantially correlate to the mood(s) of the respective music clips are selected, aligned, and fused with the music clips. The output is an auto-edited video summary with sub-shot transitions that occur at strong beats of the music, and wherein video motion intensity is matched to rhythm(s) and computed mood(s) of the music with respect to time. In addition, sentences in the auto-exited video summary are not clipped or otherwise rendered inaudible by the fused music.

The next sections introduce: an exemplary operating environment to automatically edit video data with respect to a music file; exemplary computer-program applications and program data used to edit the video data along with terminology and concepts; and an exemplary procedure to automatically edit a video file with respect to music is also presented.

An Exemplary Operating Environment

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Program modules generally include routines, programs, objects, components, data structures, etc., that perform particular tasks or implement particular abstract data types.

FIG. 1 illustrates an example of a suitable computing environment 120 on which the subsequently described systems, apparatuses and methods o automatically edit a video file with respect to music may be implemented. Exemplary computing environment 120 is only one example of a suitable computing environment and is not intended to suggest any limitation as to the scope of use or functionality of systems and methods the described herein. Neither should computing environment 120 be interpreted as having any dependency or requirement relating to any one or combination of components illustrated in computing environment 120.

The methods and systems described herein are operational with numerous other general purpose or special purpose computing system environments or configurations. Examples of well known computing systems, environments, and/or configurations that may be suitable include, but are not limited to, including hand-held devices, multi-processor systems, microprocessor based or programmable consumer electronics, network PCs, minicomputers, mainframe computers, portable communication devices, and the like. The invention may also be practiced in distributed computing environments where tasks are performed by remote processing devices that are linked through a communications network. In a distributed computing environment, program modules may be located in both local and remote memory storage devices.

As shown in FIG. 1, computing environment 120 includes a general-purpose computing device in the form of a computer 130. The components of computer 130 may include one or more processors or processing units 132, a system memory 134, and a bus 136 that couples various system components including system memory 134 to processor 132.

Bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media. In FIG. 1, system memory 134 includes computer readable media in the form of volatile memory, such as random access memory (RAM) 140, and/or non-volatile memory, such as read only memory (ROM) 138. A basic input/output system (BIOS) 142, containing the basic routines that help to transfer information between elements within computer 130, such as during startup, is stored in ROM 138. RAM 140 typically contains data and/or program modules that are immediately accessible to and/or presently being operated on by processor 132.

Computer 130 may further include other removable/non-removable, volatile/non-volatile computer storage media. For example, FIG. 1 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM/R/RW, DVD-ROM/R/RW/+R/RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 138, or RAM 140, including, e.g., an operating system 158, one or more application programs 160, other program modules 162, and program data 164.

The systems and methods described herein to automatically edit video data with respect to music may be implemented within operating system 158, one or more application programs 160, other program modules 162, and/or program data 164.

A user may provide commands and information into computer 130 through input devices such as keyboard 166 and pointing device 168 (such as a "mouse"). Other input devices (not shown) may include a microphone, joystick, game pad, satellite dish, serial port, scanner, camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 175.

Computer 130 may operate in a networked environment using logical connections to one or more remote computers, such as a remote computer 182. Remote computer 182 may include many or all of the elements and features described herein relative to computer 130. Logical connections shown in FIG. 1 are a local area network (LAN) 177 and a general wide area network (WAN) 179. Such networking environments are commonplace in offices, enterprise-wide computer networks, intranets, and the Internet.

When used in a LAN networking environment, computer 130 is connected to LAN 177 via network interface or adapter 186. When used in a WAN networking environment, the computer typically includes a modem 178 or other means for establishing communications over WAN 179. Modem 178, which may be internal or external, may be connected to system bus 136 via the user input interface 170 or other appropriate mechanism.

Depicted in FIG. 1, is a specific implementation of a WAN via the Internet. Here, computer 130 employs modem 178 to establish communications with at least one remote computer 182 via the Internet 180.

In a networked environment, program modules depicted relative to computer 130, or portions thereof, may be stored in a remote memory storage device. Thus, e.g., as depicted in FIG. 1, remote application programs 189 may reside on a memory device of remote computer 182. It will be appreciated that the network connections shown and described are exemplary and other means of establishing a communications link between the computers may be used.

Figure 2:
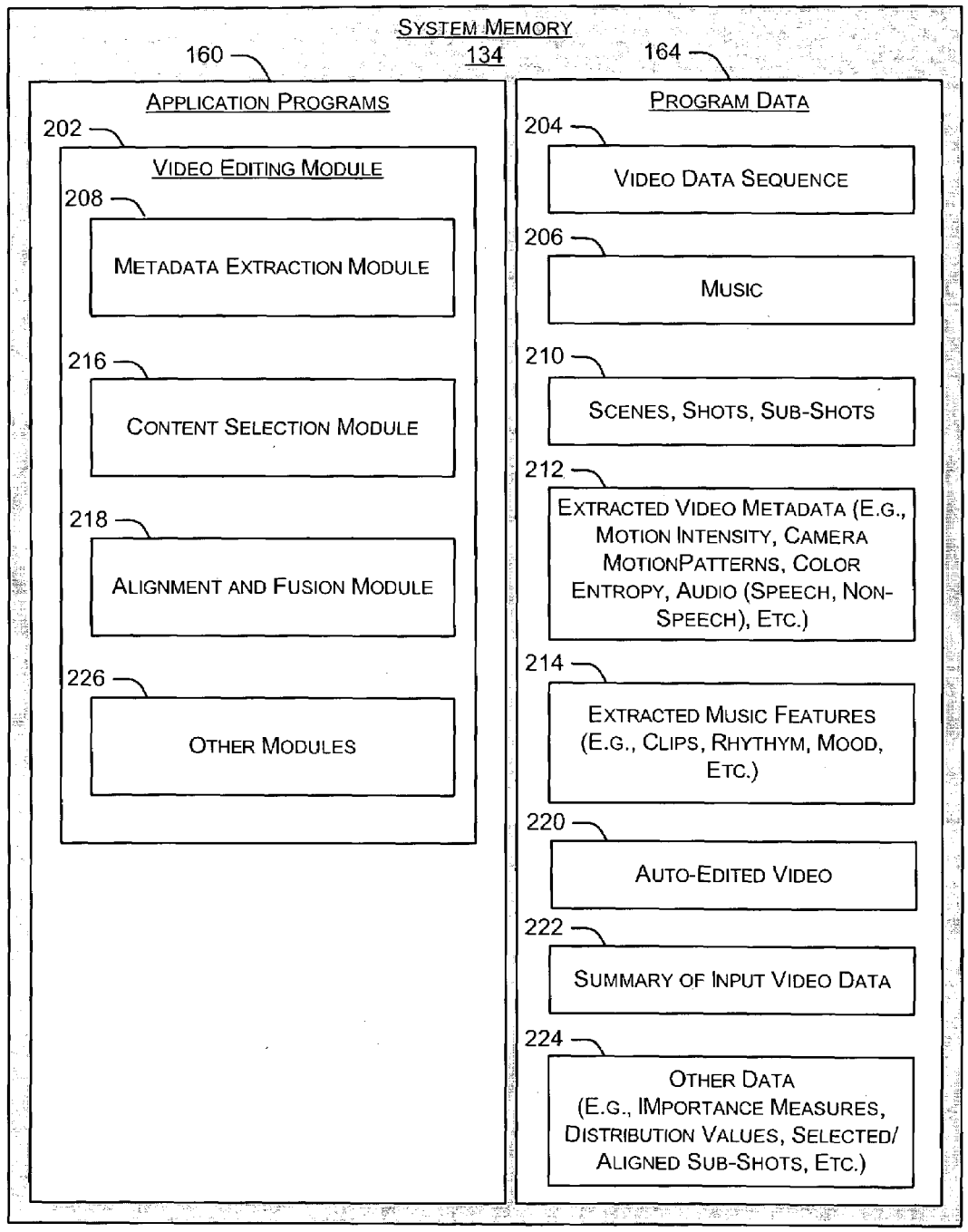
FIG. 2 is a block diagram that shows further aspects of the exemplary application programs and program data identified in the computing environment of FIG. 1. The application programs represent computer-program applications to automatically edit video data with respect to music. The program data represents data operated on and generated by the exemplary application programs during the automatic video editing process.

FIG. 2 is a block diagram that shows further exemplary aspects of application programs 160 and program data 164 of the exemplary computing device 120 of FIG. 1. The application programs operate and/or generate the program data to automatically edit video data with respect to music. In particular, system memory 134 is shown to include a number of application programs including, for example, video editing module 202. The video editing module accepts video data sequence(s) 204 and music file(s) 206 as input. These two (2) inputs 204 and 206 include three (3) types of data: video, audio, and music (the video and audio are from the input video data sequence).

Video editing module 202 utilizes metadata extraction module 208 to extract information 210–214 from the input files. In particular, the metadata extraction module performs video structure parsing (i.e., scene, shot, and sub-shot extraction), sub-shot feature extraction, sentence detection, and beat/mood detection. (Most of the extracted sub-shot features and sub-music features are normalized to [0, 1].) The extraction module removes low-quality sub-shots from the extracted information prior to its use by content selection module 216.

Content selection module 216 selects specific ones of the sub-shots (selected sub-shots are represented by "other data" 224) based on their respective importance and music clip rhythm and mood-matching characteristics. Alignment/fusion module 218 aligns the selected sub-shots with corresponding music clips based on a number of alignment criteria. The aligned sub-shots and clips or sub-musics are then fused together to generate auto-edited video 220. Each of these and other aspects of program applications 160 and program data 164 are now described in greater detail.

Video Structure Parsing

Metadata extraction module 208 uses shot detection algorithms to detect shot boundaries within video data sequence 204. For purposes of discussion, the video data sequence v consists of a series of scenes, denoted by $$\text{Scene} = \{\text{Scene}_i, 0 \leq i < K^{(SC)}\}. \quad (1)$$

Similarly, video v can also be represented as a series of shots and sub-shots, namely, $$\text{Shot} = \{\text{Shot}_i, 0 \leq i < K^{(SH)}\} \quad (2)$$

$$\text{SubShot} = \{\text{SubShot}_i, 0 \leq i < K^{(SS)}\} \quad (3)$$

wherein $K^{(SC)}$, $K^{(SH)}$ and $K^{(SS)}$ are the total number of scenes ("SC"), shots ("SH") and sub-shots ("SS") in video v, respectively. We use LB(x), RB(x) and Len(x) to denote the left/right boundaries and length of corresponding element x, respectively. N is used instead of $K^{(SS)}$, since it is used very frequently in the following equations.

To parse structure from video data sequence 204, metadata extraction module 208 analyzes the data sequence with respect to two (2) different directions. In a first direction, the video data is divided into shots and into smaller segments called sub-shots. In one implementation, this is accomplished by analyzing a frame difference curve (FDC) detect maximum crests or peaks, each of which is used to identify sub-shots. Frame difference is calculated by averaging the intensity differences of all corresponding pixels in consecutive video frames. For raw home videos, most the shot boundaries are hard cuts, which are easier to be correctly detected in comparison with professional edited videos.

Figure 3:
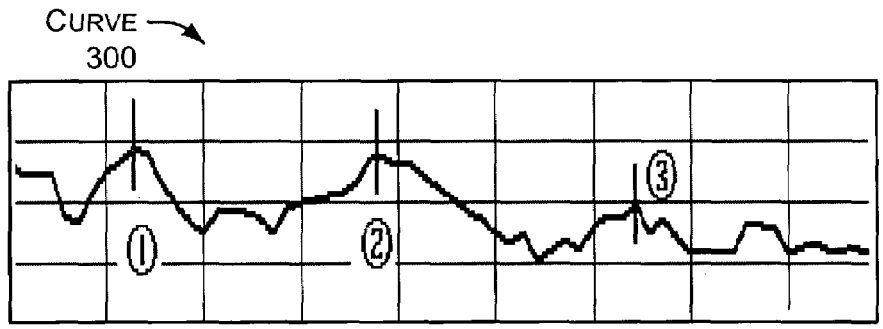
FIG. 3 is a table showing an exemplary frame difference curve (FDC). The FDC represents extracted video metadata (frame difference) that is used to detect structural aspects of an input video data sequence. Such structural aspects include, for example, sub-shot boundaries.

FIG. 3 is a table 300 showing an exemplary frame difference curve (FDC), which is used by metadata extraction module 208 to detect structural aspects (e.g., boundaries between sub-shots) with respect to an input video data sequence. In this example, three (3) sub-shot boundaries are identified. To qualify as a sub-shot boundary, a peak on the FDC should apart from the shot boundaries a certain distance, e.g., at least the minimum length of a sub-shot. When a peak in a shot is detected, the shot is cut into two at the location of the peak. At this point, if the length of a respective sub-shot is longer than a maximum sub-shot length (also discussed in greater detail below with respect to sub-shot alignment), the maximum of FDC in these two sub-shots is located and each sub-shot is divided at that respective location. This process is repeated until the lengths of all sub-shots are not longer than maximum sub-shot length.

Metadata extraction module 208 could use other techniques to identify shots in video data sequence 204. For example, in one implementation, the metadata extraction module utilizes shot detection techniques as described by reference [1] (hereby incorporated by reference) of the APPENDIX. In another implementation, the metadata extraction module utilizes shot boundary detection implementations as described in U.S. patent application Ser. No. 09/882,787, titled "A Method and Apparatus for Shot Detection", filed on Jun. 14, 2001, commonly assigned herewith, and which is hereby incorporated by reference.

Subsequent to detecting shots and sub-shots, metadata extraction module 208 analyzes the data sequence with respect to a second, different direction to merge the detected shots into groups-of-shots or "scenes". There are many scenes grouping method presented in literatures, for example, such as video scene extraction by force competition as discussed in reference [2], which is hereby incorporated by reference, of the APPENDIX. In this implementation, step-by-step the most similar adjacent scenes/shots, as determined by a similarity measure, are hierarchically merged into a larger unit. The similarity measure is the intersection of averaged and quantized color histogram with respect to hue, saturation, and luminance or HSV space. The point at which shots are no longer to be merged, or a "stop condition" can be identified by setting a shot similarity threshold or by determining a desired number of scenes. Such stop conditions can be manually or automatically configured based on any number of different criteria such as subjective or objective criteria.

Sub-Shot Feature Extraction

From identified scenes, shots, and sub-shots 210, metadata extraction module 208 extracts video metadata 212. In particular, for a sub-shot, several features are extracted according to the content and temporal location of the sub-shot, including importance ("Impt"), motion intensity, and scene ("SC") and shot ("SH") ID that it belongs to. These extracted features are denoted as follows.

$$\text{Impt}=\{impt_i, 0 \leq i < N\} \tag{4}$$

$$\text{Motion}=\{motion_i, 0 \leq i < N\} \tag{5}$$

$$\text{SC}=\{sc_i, 0 \leq i < N\}, 0 \leq sc_i < K^{(SC)} \tag{6}$$

$$\text{SH}=\{sh_i, 0 \leq i < N\}, 0 \leq sh_i < K^{(SH)} \tag{7}$$

Extracted video metadata 212 further includes, for example, any combination of color entropy, motion intensity, camera motion type/speed and speech. Color entropy is the entropy of the quantized color histogram (averaged over a sub-shot) in HSV space. In one implementation, motion intensity is obtained by computing the average length of motion vector of B and P frames in MPEG video. Motion intensity can be obtained by using motion vector field and, in a more general case, using any of a number of known techniques. Motion type and speed are determined from the direction of the motion vectors using any of a number of known techniques.

Speech/Sentence Detection

Metadata extraction module 208 detects speech from the audio channel in the input video data sequence 204. For example, speech segments are identified using techniques described in reference [3] (incorporated by reference), of the APPENDIX. In particular, such exemplary techniques are used to classify detected audio as speech or non-speech (e.g., music and noise segments).

Sentences are represented as follows:

$$\text{ST}=\{st_i, 0 \leq i < K^{(ST)}\} \tag{8}$$

Sentence breaks are detected with respect to the identified speech segments by locating substantially long pause(s) between identified speech segments, thereby identifying sentences.

Figure 4:
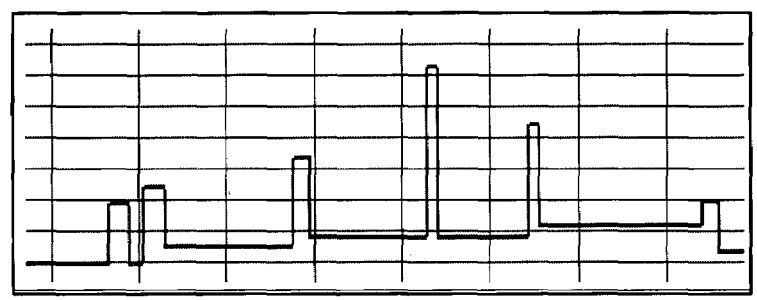
FIG. 4 is a table illustrating an exemplary speech detection data curve, which represents results of sentence segmentation operations.

FIG. 4 is a table 400 illustrating exemplary speech detection data curve representing results of sentence segmentation. Detected pause duration in speech is used to segment speech into sentences. Peaks in the speech data curve represent the average energy of each sentence, after the sentence has been segmented based on pause duration

Music Beat and Mood Determination

Metadata extraction module 208 segments and determines numerous features 214 from the input music 206. In particular, the input music file is segmented into "sub-music" or clips according to locations of significantly strong beats or rhythms. "Mood" feature(s) are determined from the sub-musics.

For purposes of discussion, the following mathematical symbols and equations are used to denote music sub-music, mood, and beat. Sub-music(s) of music m 206 is denoted by $$\text{SubMusic}=\{SubMusic_i, 0 \leq i < M\} \tag{9},$$

wherein M represents a number of sub-shots that are selected based on importance criteria described below. The corresponding mood of each calculated sub-music is denoted by $$\text{Mood}=\{mood_i, 0 \leq i < M\} \tag{10}.$$

The strength of the beat after each sub-music (except the last one) is denoted by $$\text{Beat}=\{beat_i, 0 \leq i < M-1\} \tag{11}.$$

Music beat can be detected using a number of sophisticated algorithms. For example, the beat of input music 206 can be detected with via the algorithm described in reference [4] (hereby incorporated by reference) of the APPENDIX. In this implementation, however, metadata extraction module 208 detects beat by locating local maximums of energy variance in a sliding window. (A sliding window is a window with a certain length. It is used to select a part from a data sequence, with or without overlap. For example, a sliding window with 5 second for 100s data sequence, can be a segment with 0–5s, then 1–6s, 2–7s, . . . 95–100s.) Mood of the input music 206 is calculated from the beat frequency in the sub-music.

Figure 5:
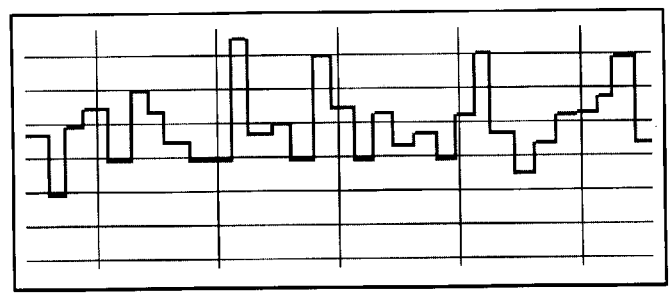
FIG. 5 is a table that shows exemplary extracted music metadata. The extracted music metadata is used to detect strong beats and moods with respect to music clips or "sub-musics" from an input music file.

FIG. 5 is a table that shows an exemplary data curve that identifies detected strong beats and moods in music. Each line segment represents one sub-music and the height of indicate the "mood"/strength of the sub-music.

Figure 6:
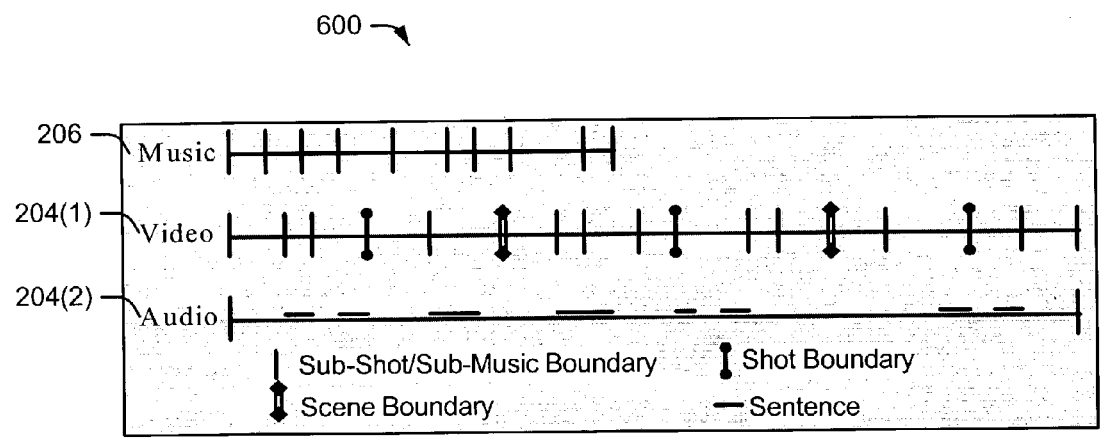
FIG. 6 is a table that illustrates exemplary aspects of music, video and audio data sequences. In particular, the data sequences are shown with respect to metadata (video and audio) extracted from an input video sequence, and music metadata (music clips or "sub-musics") extracted from an input music file.

FIG. 6 is a table 600 that illustrates exemplary aspects of music 206, video 204(1) and audio 204(2) input data sequences. In particular, the music, video, and audio data sequences of FIG. 6 are shown with respect to extracted video and audio metadata, and determined music clips or "sub-musics". Video and audio data sequences are input in parallel (i.e., as part of the same data sequence). This is because in combination they represent an input video data sequence 204.

The music 206, video 204(1) and audio 204(2) data segments are vertically juxtaposed with respect to one another to illustrate data relationships with respect to identified structure (e.g., scene, shot, sub-shot/sub-music, and sentence boundaries). For example, the horizontal axis of the table represents length or size of the input data sequences. Although this example shows the input music segment as smaller relative to the input video data sequence (video and audio), the input music segment could be larger or longer in duration than the video data sequence.

With respect to input data sequence components, music 206 is shown to have been segmented into "sub-music" or clips according to locations of significantly strong beats or rhythms. Each of the clips is illustrated with line-segments that are orthogonal to the music data line. Video data 204(1) is shown to have been segmented into shots and sub-shots, adjacent combinations of which represent scenes. The shots and sub-shots are identified with corresponding line segments that are perpendicular to the video data line. Audio data 204(2) is shown to have been analyzed to identify sentences. The sentences are illustrated as having boundaries and a length relative to the audio data line, as shown by corresponding line segments that are juxtaposed immediately above to the audio data line.

Content Selection

At this point, referring to FIG. 2, video structure 210 and metadata 212 (e.g., motion intensity, color entropy, audio sentence/energy, etc.) aspects of input video sequence 204 have been extracted from the video data sequence. Additionally, music clips or sub-musics, rhythm, and mood features 214 have been extracted from the input music 206. Content selection module 216 analyzes these extracted and calculated features 210–216 to select a series of sub-shots for alignment and integration or fusion with the input music 206 to generate auto-edited video 220. (Alignment and fusion is performed by alignment and fusion program module 218). The auto-edited video which is essentially a summary of the input video data sequence that has been edited with respect to the input music.

Content selection module 216 removes low quality frame sequences (e.g., those with poor color entropy, abnormal motion analysis results, etc.) from the extracted video shots, sub-shots, and/or scenes 210. For example, very dark or bright images, and homogeneous images (e.g., a floor or wall), identified with substantially low color entropy, are removed from the identified sub-shots. Very dark or bright images may be generated when video exposure parameters are not well set. Homogenous images (e.g., a floor or wall) may caused by wrong focus setting.

By analyzing camera motion type and speed, video segments representative of very fast pans or zooms are detected and removed. Such video segments may be caused by changing the view point rapidly without stopping the machine or zooming in/out too quickly. Additionally, motion analysis is used to remove tempestuously shaking images from the detected video shots and sub-shots. Here, seven (7) parameters are used to determine where camera is shaking. They are grey gradient, color histogram, forward prediction ratio A, non-prediction ratio B, magnitude of motion vector, variance of motion vector and direction histogram of motion vector. The last 5 parameters are all computed based on motion vector field of P-frame in MPEG stream. The two ratios, A and B, are defined as follows:

$$A = \frac{\text{number of macroblock\_forward}}{\text{total number of frame macroblock}}, \text{and}$$

$$B = \frac{\text{number of macroblock\_intra}}{\text{total number of frame macroblock}}.$$

In one implementation, during camera shake detection, a sliding widow with the size of fifteen (15) frames is employed to calculate statistical values of these parameters. That is, average grey gradient, color histogram difference, average forward prediction ratio A, average non-prediction ratio B, average magnitude of motion vector, average variance of motion vector, and dominant direction of motion vector. Based on these statistical parameters, we detect camera motion by 2 steps:

1) If the average A is lower than its threshold and average B, average magnitude of motion vector and average variance of motion vector are greater than their thresholds respectively, meanwhile, there is not any dominant camera motion the current video clip is the candidate of camera shaking.
2) If the average grey gradient have a lower value and the color histogram difference is high in this clip, this clip is confirmed to be the camera shaking segment.

Calculating Relative Sub-Shot Importance

Subsequent to removing low quality sub-shots from the extracted video structure 210, content selection module 216 computes an importance measure for each remaining sub-shot. A summary 222 of the input video data sequence is created from the extracted information based on the computed importance measures. The summary is generated such that it will incorporate important concepts from the input video data sequence, lower importance and quality aspects of the input sequence having already been filtered out.

In one implementation, the extracted/calculated color entropy, motion intensity, camera motion type/speed and speech features 212 are combined to generate an "importance measure". For example, the importance measure is based on $$impt = p_1 ColorEntropy + p_2 MotionIntensity + p_3 Type + p_4 Speech \quad (12)$$

where $p_1+p_2+p_3+p_4=1$ and $$Type = \begin{cases} 1, & \text{if motion type is zoom or pan,} \\ & \text{but the speed is less than some threshold } \Delta. \\ 0, & \text{else} \end{cases} \quad (13)$$

$$Speech = \begin{cases} 1, & \text{if speech detected in the subshot} \\ 0, & \text{else} \end{cases} \quad (14)$$

The value of $p=\{p_i, 1 \leq i \leq 4\}$ is determined based on users' biases.

Figure 7:
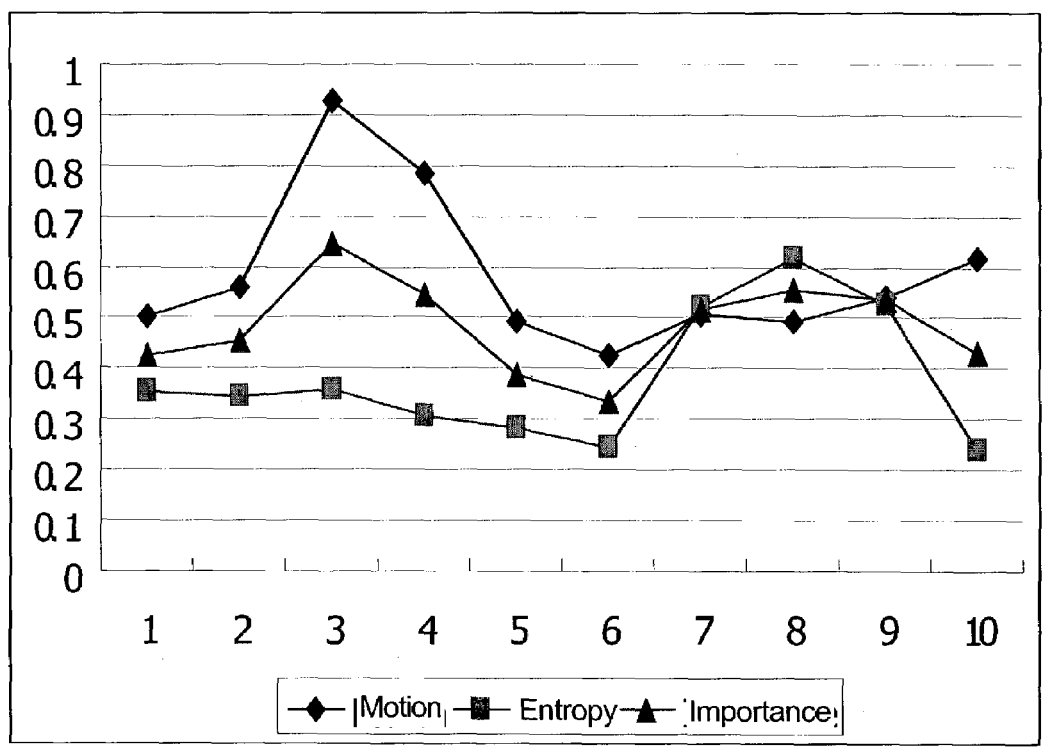
FIG. 7 is a table that illustrates exemplary values for extracted video metadata. In particular, color entropy, motion intensity, and calculated sub-shot importance data values are shown with respect to one-another.

FIG. 7 is a table 700 that illustrates exemplary color entropy, motion intensity, and calculated sub-shot importance data curves, information for which has been extracted and/or calculated from the input data sequence.

Although this implementation utilizes the combination of color entropy, motion intensity, camera motion type/speed, and speech as factors in determining sub-shot importance measures, other techniques could be used. For example, in another implementation, the techniques described in U.S. patent application titled "Systems and Methods for Generating a Comprehensive User Attention Model" (incorporated above by reference), could also be used to determine sub-shot importance measures.

Optimization-Based Sub-Shot Selection

In one implementation, content selection module 216 implements optimization-based sub-shot selection operations for selecting important sub-shots for the alignment and fusion with input music 206. The selected sub-shots 210 are matched with calculated sub-music moods 214. Selected sub-shots are uniformly distributed with respect to the other selected sub-shots that comprise shots and ultimately scenes in the video summary 222 (has not yet been aligned or fused with music). The optimization-based sub-shot selection operations are described with respect to the following constraints or mathematical equations.

Let $\Theta$ denotes the set of all sub-shot subsets of $\{0, 1, 2, \ldots, N-1\}$ that contain M sub-shots, and then the problem (e.g., selecting the important sub-shots from the total sub-shot set, and at the same time, matching the music with the selected sub-shots, and make the distribution of selected sub-shot nearly normally distributed in scene and shot level) is represented as:

Maximize/MinimizeObjectFuction(m,v,θ)

where $\theta \in \Theta$ (15).

To select sub-shots of higher relative importance than other sub-shots, content selection module 216 measures the normalized importance of the sub-shots according to $$I(m, v, \theta) = I\left(impt^{(\theta)}\right) \quad (16)$$
$$= \frac{1}{M} \sum_{i=1}^{M-1} impt_i^{(\theta)}.$$

To match sub-shots(s) with the music mood, content selection module 216 utilizes a correlation coefficient of the music mood sequence and the motion intensity sequence of the selected sub-shots. That is, $$\rho(m, v, \theta) = \rho(mood, motion^{(\theta)}) \quad (17)$$
$$= \frac{E\left((mood - \overline{mood})(motion^{(\theta)} - \overline{motion^{(\theta)}})\right)}{\sqrt{D(mood)} \sqrt{D(motion^{(\theta)})}}$$

where $\overline{x}$ (also denoted by $E(x)$ for convenience) and $D(x)$ denote the mean and variance of sequence x, and the superscript θ means that the corresponding sequence is the selected sub-sequence of the original one. We have $-1 \leq \rho(m,v,\theta) \leq 1$ (18).

Content selection module 216 represents distribution uniformity via normalized entropy, which at the scene level is based on the following:

$$H^{(SC)}(m, v, \theta) = H(SC^{(\theta)}) \quad (19)$$
$$= -\frac{1}{\log K^{(SC)}} \sum_{i=0}^{K^{(SC)}-1} p_i \log p_i$$

where $p_i = \dfrac{\text{\# of selected subshot in } Scene_i}{M}$.

Distribution uniformity at the shot level is represented as follows: $H^{(SH)}(m,v,\theta) = H(SH^{(\theta)})$. Thus the overall measure for distribution uniformity is $H(m,v,\theta) = k_1 H^{(SC)}(m,v,\theta) + k_2 H^{(SH)}(m,v,\theta)$ where $k_1, k_2 \geq 0, k_1 + k_2 = 1$ (20).

In these formulations, $0 \leq H(m,v,\theta) \leq 1$ (21).

Consequently, to perform optimization-based sub-shot selection, we determine θ* which satisfy $$\theta^* = \arg\max_{\theta}\{F(m, v, \theta), \theta \in \Theta\} \quad (22)$$
$$F(m, v, \theta) = \alpha\rho + \beta I + \gamma H,$$
where $\alpha, \beta, \gamma \geq 0, \alpha + \beta + \gamma = 1$, We have $-\alpha \leq F(m,v,\theta) \leq 1$ (23).

Replacing $(\rho+1)/2$ with ρ in (26), F(m,v,θ) can be normalized into [0, 1]. As explained below, these optimization-based sub-shot selection algorithms can be even more clearly re-written as a nonlinear 0–1 programming problem.

In particular, subset $\theta \in \Theta$ can also be represented by a N-dimensional 0–1 sequence x as $$x = \{x_i, 0 \leq i < N\}, \quad (24)$$
$$\text{where } x_i = \begin{cases} 1, & \text{if } i \in \theta \\ 0, & \text{if } i \notin \theta \end{cases}, 0 \leq i < N.$$

The importance measure I(m,v,θ) can be rewritten as $$I(m, v, x) = \sum_{i=0}^{N-1} x_i \cdot impt_i, \quad (25)$$

which is a linear function.

In view of this, the sub-shot distribution uniformity measure is rewritten as $$H(m, v, x) = k_1 \left[ -\frac{1}{\log K^{(SC)}} \sum_{i=0}^{K^{(SC)}-1} p_i \log p_i \right] + \quad (26)$$
$$k_2 \left[ -\frac{1}{\log K^{(SH)}} \sum_{j=0}^{K^{(SH)}-1} q_j \log q_j \right],$$

wherein $$p_i = \frac{\sum_{M_i^{(SC)}}^{M_{i+1}^{(SC)}-1} x_i}{M}, M_i^{(SC)} = |\{s \in SC, s < i\}|, \quad (27)$$

$$q_j = \frac{\sum_{M_j^{(SH)}}^{M_{j+1}^{(SH)}-1} x_j}{M}, M_j^{(SH)} = |\{s \in SH, s < j\}|, \text{ and} \quad (28)$$

wherein |•| denotes the number of elements in a finite set. This measure is nonlinear. The "motion-mood" matching measure of the optimization-based sub-shot selection operations discussed above can be rewritten in a similar way, and it is also not a linear function.

Consequently, the optimization-based sub-shot selection operations are re-written as a nonlinear 0–1 integer-programming problem as below.

$$\min F(m, v, x) = \alpha \rho + \beta I + \gamma H \quad (29)$$

$$s.t. \sum_{i=0}^{N-1} x_i = M, x_i \in \{0, 1\}.$$

Note that the number of elements in $\Theta$, or the size of feasible solution space is $$|\Theta| = C_N^M = \frac{N!}{M!(N-M)!}. \quad (30)$$

When N and M are large, this value increases rapidly even faster than exponential functions. In view of this, optimization-based sub-shot selection is a NP-hard problem (i.e., Non-deterministic Polynomial-time hard problem). Thus dimension decreasing and genetic algorithms are used to find the local optimization solutions.

For example, with respect to decreasing dimension, when M and N are large, the search space is very big. However, if M and N are small enough, the complexity of the equation will decrease rapidly. This enlightens us to break the problem into smaller sub-problems that can be solved by exhaust searching. A reasonable method is to divide the music into several segments according to the number of scenes in the video, and then the object function is optimized for each segment of the music. The scene number is controlled. Therefore, the number of sub-musics assigned to each segment of music can be constrained to fit into the scene. After we solve each sub-problem, the overall results are the final solution, which is auto-edited video 220.

A general searching method for solving NP-hard problems is the well known genetic algorithm approach, which does not guarantee a global optimal solution in polynomial time but provides a good enough solution. To use the genetic algorithm, two problems are addressed. One is encoding method of the solutions (population). Fortunately, our problem is a 0–1 programming, so the 0–1 sequences are directly taken to be the code of the feasible solutions, i.e., the population of the genetic algorithm.

The second problem is how to generate child solutions from parent solutions. For our problem, the acceptable solution neighborhood must satisfy constraints illustrated in (24). So we may generate child gene by single parent using the following method. Randomly generate four integers in (0, N), denoted by $$0 \leq R_0 < R_1 < R_2 < R_3 < N \quad (31).$$

The "alleles" clip $[R_0, R_1)$ and $[R_2, R_3)$ is exchanges to obtain the child solutions (or "chromosome"). The genetic algorithm is stopped when a maximum number of iterations has been reached or a desired result has been achieved.

In view of the above, only the objective aspects of the optimization-based sub-shot selection algorithm, which consists of three (3) parts, could be simplified; recall that this is an unconstrained programming problem. The three parts include sub-shot importance, sub-shot/mood correlation, and distribution uniformity measures. Equation (28), I(m,v, x), is a linear function.

If we only want to keep the most important part of the video, we may let I(m,v,x) be the object function. Then the problem becomes a very special one and all we need to do is to pick M most important sub-shots from the video. However, this kind of result may not provide a substantially optimal solution, since lots of similar sub-shots may be selected. In light of this, distribution uniformity is used to ensure that there is a uniform distribution of the selected sub-shots. That is to say, an video summary without incidental music can be generated automatically by solving the optimization problem $$\min F(v, x) = \beta I + \gamma H \quad (32)$$

$$s.t. \sum_{i=0}^{N-1} x_i = M, x_i \in \{0, 1\},$$

wherein, I is the importance measure, H is the distribution uniformity measure, M is number of selected sub-shots.

Entropy is a non-linear function. However, if we use mean deviation to measure the distribution uniformity instead of entropy, as $$MD(m, v, x) = \frac{1}{K^{(SC)}} \sum_{i=0}^{K^{(SC)}} \left| \sum_{j=M_i}^{M_{i+1}-1} x_j - \frac{M}{K^{(SC)}} \right|, \quad (33)$$

The measure can be re-formulated as a piecewise linear object function. That is $$DN(m,v,x) = 1 - \lambda \cdot MD(m,v,x) \quad (34),$$

wherein $\lambda$ is a factor used to make the second item of the above equation normalized to interval [0,1]. The minimum of MD(m,v,x) is zero, and $$\max_x \{MD(m, v, x)\} = \frac{2M(K^{(SC)} - 1)}{(K^{(SC)})^2}. \quad (35)$$

Accordingly, we choose $\lambda$ as $$\lambda = \frac{(K^{(SC)})^2}{2M(K^{(SC)} - 1)}. \quad (36)$$

In the shot level, we can re-formulate the distribution uniformity in a similar way. By transfer the distribution uniformity measure into a piecewise function, we may utilize previous research results in 0–1 programming. By assigning each scene a certain number of selected sub-shots, the distribution uniformity measure will not be very low. Thus we can identify enough important sub-shots, which will also be considerably uniformly distributed.

The above simplification, expressed in equations 32–36, is used to generate video summary 222 via an optimization based video summary/editing technique that does not match selected sub-shots with music. Also, if we want to add some more constraints other than music matching, we will get desired optimization results according to those constraints.

For instance, the correlation coefficient can be extracted from the object function and used as a constraint. By this, we may select best-matched music for a given home video. For example, we apply the optimization procedure on a video v, and several different music files, $m_1, m_2, \ldots, m_k$. The music which make the correlation coefficient has the greatest value, i.e., $m_i$, $i=\arg \max \rho(m_j, v, \theta)$, is the best-matched music for that video. Furthermore, if we need emphasize one or more of the three components, we may take them as constraints or give bigger weights for them in equations (29) and (32).

Alignment and Fusion of the Selected Sub-Shots with the Music

Alignment/fusion module 218 aligns the selected sub-shots (selected by content selection module 216) and music with respect to the following alignment criteria:

- sub-shot boundary and music beat alignment criteria, such that sub-shot transitions (it is shot transition in the output video) in the output video correspond to the beat of the music;
- sub-shot boundary and sentence alignment criteria, such that a sentence is not cut off in the midway by a sub-shot boundary; and,
- matching music mood with motion intensity alignment criteria, which was discussed above with respect to the optimization-based sub-shot selection operations of content selection module 216.

To implement these alignment criteria, alignment and fusion module 218 edits the length of the sub-shots and sub-musics so that their respective lengths are substantially the same. (For purposes of discussion, maximum and minimum lengths are represented with the following syntax: $L_{max}$ and $L_{min}$). To this end, if the length of a selected sub-shot is longer than the corresponding sub-music, the sub-shot is shortened until it is of equal length. Oppositely, if the length of the sub-shot is shorter than the sub-music, the sub-shot is merged with an adjacent sub-shot which is in the same shot. With respect to sentence alignment, sub-shot boundaries are shifted to ensure that the sentence is contained in one sub-shot. If the sentence and corresponding sub-shot is longer than the corresponding sub-music, the sentence is faded out or alternatively, the sub-music is merged with another sub-music that has a considerably similar mood-match.

The described sub-shot/sentence/sub-music alignment operations can be optionally optimized. The object function value after alignment may significantly change in comparison to the value previously calculated above in the optimization-based sub-shot selection procedure (see, content selection module 216 operations) for a particular sub-shot. This is because the described alignment operations may change a sub-shot's corresponding features (e.g., by shortening or merging sub-shots). To account for any pre and post aligned sub-shot feature disparity, the features of the aligned sub-shots are modified to the point that they are as substantially close to the features of the original selected sub-shot as possible.

For example, suppose $SubShot_i$ is a selected sub-shot whose length is longer than the corresponding sub-music $SubMusic_j$, and we need to cut off $SubShot_i$. Let $SS_k$ denotes all sub-sequences of $SubShot_i$ whose length is equal to $Len(SubMusic_j)$. Then the aligned sub-shot is determined by $$SubShot_i^a = \underset{SS_k}{\arg\min}\{|impt_i - Impt(SS_k)| + |motion_i - Motion(SS_k)|\}, \quad (37)$$

wherein $Impt(SS_k)$ and $Motion(SS_k)$ denote the importance and motion intensity of $SS_k$, respectively. Oppositely, if the length of $SubShot_i$ is less than $Len(SubMusic_j)$, we merge the sub-shot(s) adjacent to $SubShot_i$, and then follow the above procedure. In addition, we can also use the features of aligned sub-shots to calculate the fitness (object function value in the genetic algorithm used to identify or select sub-shots for incorporation into the auto-edited video 220), which can even better to reduce the errors caused by alignment.

Alignment and fusion module 218 fuses or integrates the selected and aligned sub-shots 224 and music 206 to generate auto-edited video 220. To accomplish this, numerous different sub-shot-to-sub-shot transitions are used. The type of the transition between two sub-shots is determined based on the similarity of these two shots, which is described as follows:

If $SceneID_i = SceneID_{i+1}$, then Fade out/Fade in, otherwise,

If $SceneID_i \neq SceneID_{i+1}$, then Randomly choose from other types.

In this implementation, up to fifteen (15) different types of transitions can be selected from for use between respective sub-shots. These sub-shot transitions are provided by Microsoft Corporation's DirectX®, which fuses the selected and aligned sub-shots 224 with the music 206 into the auto-edited video file 220.

The length of transition between two (2) respective sub-shots is determined by the beat strength of the corresponding sub-music 224, and which is described by equation (38):

$$\text{Transition Length}_i = 1 - beat_i \quad (38),$$

wherein $0 \leq i < M-1$. More complex transition selecting methods can be designed by take more features of the video/music and biases of users into account.

Alternative Implementations—Rule Based Sub-Shot Selection

Rather than solving the optimization-based sub-shot selection equations described above, for example, by decreasing dimension and using a genetic algorithm, other criteria can be used to select sub-shots for subsequent alignment with input music 206.

For example, content selection module 210 can use a number of rule-based criteria to divide the music 206 into $K^{(SC)}$ segments, denoted by $MSS_j$. These segments do not correspond to the above discussed music clips or sub-musics. The length of each segment is determined by the average sub-shot importance of a scene, as define by:

$$Len(MSS_i) = \frac{\underset{SubShot_j \in Scene_i}{\sum} impt_j}{\underset{j=0}{\overset{N}{\sum}} impt_j} \cdot \sum_{j=0}^{M} Len(SubMusic_j). \quad (39)$$

Content selection module then selects sub-shots from each scene Scene$_i$ for a music segment, wherein the number of sub-shots selected from Scene$_i$ is equal to the number of sub-musics in MSS$_j$.

In this manner, only one segment of music and one video scene need be considered at a time. And with respect to the scene, the process can be repeated such that selection is with respect to shots. If the number of shots in the scene is greater than assigned sub-shot number, the most unimportant shots are dropped. After that, one most important sub-shot from each shot is selected and combined with one another with respect to the music.

A Procedure to Automatically Edit a Video with Respect to Music

Figure 8:
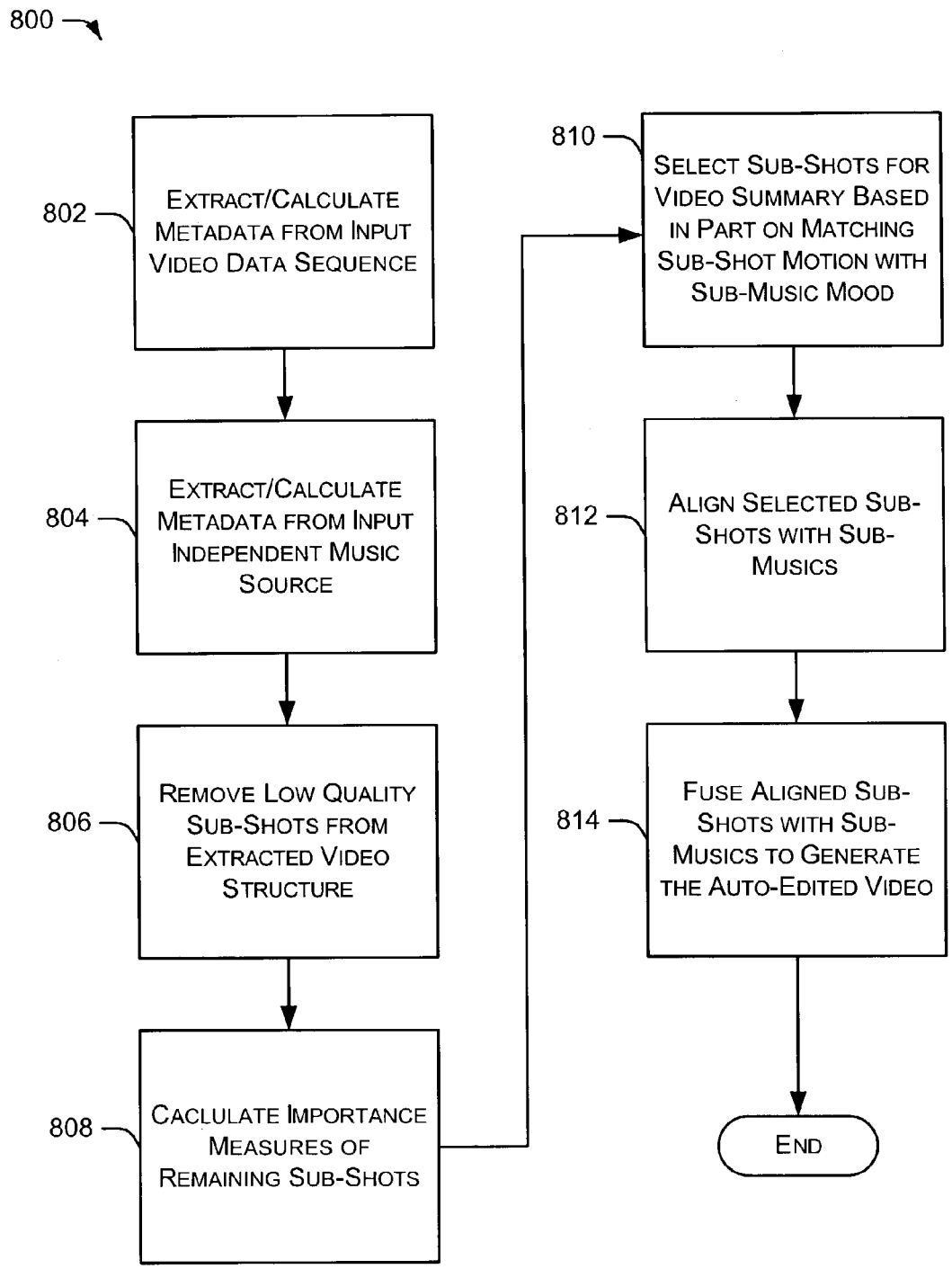
FIG. 8 shows an exemplary procedure to automatically edit video data, according to one embodiment.

FIG. 8 is a flow diagram showing an exemplary procedure 800 to automatically edit a video with respect to an independent music source. For purposes of discussion, the operations of this procedure are described with respect to the computer program applications 160 and program data 164 of FIG. 2. At block 802, metadata extraction model extracts and/or calculates metadata (shots, sub shots, scenes, motion intensity, camera attention, etc.) from input video data sequence 204. At block 804, metadata extraction model extracts and/or calculates metadata (sub musics, rhythm, mood, etc.) from independent music source 206.

At block 806, content selection module 216 removes low quality sub-shots from extracted video structure 210. At block 808, the content selection module calculates respective important measures of the remaining sub-shots. At block 802, the content selection module selects sub-shots to represent a summary 222 of the input video data 204 based at least in part on matching sub-block motion intensities (part of extracted video metadata 212) with calculated sub-music moods (part of extracted music features 214). In the example of FIG. 2, the selected sub shots are represented by "other data" 224.

At block 812, alignment/fusion module 218 aligns the selected sub-shots with the sub-musics according to a number of alignment criteria, as discussed above. At block 814, the alignment/fusion module fuses the aligned sub shots with the sub-musics to generate the auto-edited video 220.

Conclusion

The described systems and methods automatically edit an input video data sequence with respect to input music. Although the systems and methods have been described in language specific to structural features and methodological operations, the subject matter as defined in the appended claims are not necessarily limited to the specific features or operations described. Rather, the specific features and operations are disclosed as exemplary forms of implementing the claimed subject matter.

APPENDIX—REFERENCES

[1] D. Zhang, W. Qi, H. J. Zhang, "A New Shot Detection Algorithm," *2nd IEEE Pacific-Rim Conf on Multimedia (PCM2001)*, pp. 63–70, Beijing, China, October 2001.

[2] T. Lin, H. J. Zhang, "Video Scene Extraction by Force Competition," *IEEE Intl Conf on Multimedia and Expo (ICME 001)*, Waseda University, Tokyo, Japan, Aug. 22–25, 2001.

[3] L. Lu, H. Jiang, H. J. Zhang, "A Robust Audio Classification and Segmentation Method," *9th ACM Multimedia*, pp. 203–211, 2001.

[4] Eric D. Scheirer, "Tempo and beat analysis of acoustic musical signals," *Journal of the Acoustical Society of America*, 103(1):588–601, 1998.

The invention claimed is:

1. A method for automatically editing a video data sequence to generate a video summary, the method comprising:
   extracting sub-shots from the video data sequence;
   calculating importance measures for at least a portion of the sub-shots;
   identifying particular ones of the portion that have relatively higher importance measures as compared to importance measures of other sub-shots;
   determining a relative distribution of each sub-shot in the particular ones;
   based on relative distributions of each sub-shot of the particular ones, dropping sub-shots from the particular ones that do not have a uniform distribution with respect to other sub-shots in the particular ones; and
   connecting remaining sub-shots in the particular ones with respective shot transitions to generate the video summary.

2. A method as recited in claim 1, wherein the portion of the sub-shots consists of substantially higher quality sub-shots of the sub-shots.

3. A method as recited in claim 1, wherein the operations of identifying, determining, and dropping are based on the following optimization:

$$\min F(v,x) = \beta I + \gamma H$$

$$s.t. \Sigma_{i=0}^{N-1} x_i = M, x_i \in \{0,1\},$$

wherein I is the importance measure, H is the distribution uniformity measure, M is number of selected sub-shots.

4. A computer-readable medium comprising computer-program instructions for automatically editing a video data sequence to generate a video summary, the computer-program instructions being executable by a processor for:
   extracting sub-shots from the video data sequence;
   calculating importance measures for at least a portion of the sub-shots;
   identifying particular ones of the portion that have relatively higher importance measures as compared to importance measures of other sub-shots;
   determining a relative distribution of each sub-shot in the particular ones;
   based on relative distributions of each sub-shot of the particular ones, dropping sub-shots from the particular ones that do not have a uniform distribution with respect to other sub-shots in the particular ones; and
   connecting remaining sub-shots in the particular ones with respective shot transitions to generate the video summary.

5. A computer-readable medium as recited in claim 4, wherein the portion of the sub-shots consists of substantially higher quality sub-shots of the sub-shots.

6. A computer-readable medium as recited in claim 4, wherein the computer-program instructions for identifying, determining, and dropping are based on the following optimization:

$$\min F(v,x) = \beta I + \gamma H$$

$$s.t. \Sigma_{i=0}^{N-1} x_i = M, x_i \in \{0,1\},$$

wherein I is the importance measure, H is the distribution uniformity measure, M is number of selected sub-shots.

7. A computing device for automatically editing a video data sequence to generate a video summary, the computing device comprising:
  a processor; and
  a memory coupled to the processor, the memory comprising computer-program instructions being executable by the processor for:
    extracting sub-shots from the video data sequence;
    calculating importance measures for at least a portion of the sub-shots;
    identifying particular ones of the portion that have relatively higher importance measures as compared to importance measures of other sub-shots;
    determining a relative distribution of each sub-shot in the particular ones;
    based on relative distributions of each sub-shot of the particular ones, dropping sub-shots from the particular ones that do not have a uniform distribution with respect to other sub-shots in the particular ones; and
    connecting remaining sub-shots in the particular ones with respective shot transitions to generate the video summary.

8. A computing device as recited in claim 7, wherein the portion of the sub-shots consists of substantially higher quality sub-shots of the sub-shots.

9. A computing device as recited in claim 7, wherein the instructions for identifying, determining, and dropping are based on the following optimization:

$$\min F(v,x) = \beta I + \gamma H$$

$$s.t. \Sigma_{i=0}^{N-1} x_i = M, x_i \in \{0,1\},$$

wherein I is the importance measure, H is the distribution uniformity measure, M is number of selected sub-shots.

10. A method for automatically editing a video data sequence with respect to an independent music source, the method comprising:
  extracting metadata from the video data sequence and the independent music source, the metadata comprising sub-shots and sub-musics;
  calculating importance measures for at least a portion of the sub-shots;
  identifying particular ones of the portion that have relatively higher importance measures as compared to importance measures of other sub-shots;
  identifying respective moods for each of the sub-musics;
  matching sub-shot motion intensity to sub-music moods to identify particular ones of the sub-shots;
  aligning the particular ones with corresponding sub-musics; and
  fusing aligned sub-shots with corresponding sub-musics to generate an auto-edited video.

11. A method as recited in claim 10, wherein extracting further comprises generating a frame difference curve to identify sub-shots in the video data sequence.

12. A method as recited in claim 10, wherein extracting further comprises:
  analyzing the video data sequence in a first direction to identify shots and sub-shots; and
  analyzing the video data sequence in a second direction to merge detected shots and sub-shots into one or more scenes.

13. A method as recited in claim 10, wherein aligning is based on sub-shot boundary and music beat alignment criteria, sub-shot boundary and sentence alignment criteria, and matching music mood with motion intensity alignment criteria.

14. A method as recited in claim 10, wherein extracting further comprises:
  identifying shots, scenes, motion intensity and color entropy for sub-shots, and speech data from an audio channel of the video data sequence;
  detecting sentence boundaries from the speech data; and
  segmenting the independent music source into the sub-musics according to locations of respective beats.

15. A method as recited in claim 10, wherein after extracting and before matching, the method further comprises:
  dropping low-quality sub-shots from the sub-shots to leave substantially higher quality sub-shots;
  calculating importance measures for the substantially higher quality sub-shots;
  calculating mood values for the sub-musics; and
  wherein matching particular ones of the sub-shots to the sub-musics is further based on the importance measures, such that the particular ones are selected to be sub-shots with relatively higher importance measures as compared to importance measures of sub-shots not represented in the particular ones.

16. A method as recited in claim 10, wherein aligning further comprises changing lengths of one or more sub-shots so that corresponding sub-shot and sub-music lengths are substantially the same.

17. A method as recited in claim 10, wherein aligning is performed such that a sentence having a beginning and an end is not clipped, the sentence being detected in one or more sub-shots of the particular ones.

18. A method as recited in claim 10, wherein fusing is performed such that a sentence in an aligned sub-shot is not rendered in-audible with respect to a corresponding sub-music.

19. A method as recited in claim 10, wherein the video data sequence comprises video frames, and wherein after extracting and before matching, the method further comprises:
  detecting visual quality of the video frames and/or sub-shots; and
  dropping low-quality video frames and/or sub-shots to leave substantially higher quality video frames and/or sub-shots.

20. A method as recited in claim 19, wherein dropped frames and/or sub-shots comprise a dropped sequence of frames and/or sub-shots, and wherein low quality frames and/or sub-shots correspond to any combination of the following attributes: poor color-entropy and abnormal motion analysis results.

21. A computer-readable medium comprising computer-executable instructions for editing a video data sequence with respect to an independent music source, the computer-executable instructions comprising instructions for:
  extracting metadata from the video data sequence and the independent music source, the metadata comprising sub-shots and sub-musics;
  calculating importance measures for at least a portion of the sub-shots;
  identifying particular ones of the portion that have relatively higher importance measures as compared to importance measures of other sub-shots;
  identifying respective moods for each of the sub-musics;
  matching respective sub-shot motion intensities to the respective moods to identify particular ones of the sub-shots to align and fuse with the independent music source;

aligning the particular ones with corresponding sub-musics; and fusing aligned sub-shots with corresponding sub-musics to generate an auto-edited video.

22. A computer-readable medium as recited in claim 21, wherein the instructions for extracting further comprise computer-program instructions for merging detected shots and sub-shots into one or more scenes.

23. A computer-readable medium as recited in claim 21, wherein after the instructions for extracting and before the instructions for matching, the computer-program instructions further comprise instructions for dropping low-quality sub-shots from the sub-shots to leave substantially higher quality sub-shots.

24. A computer-readable medium as recited in claim 21, wherein aligning is based on sub-shot boundary and music beat alignment criteria, sub-shot boundary and sentence alignment criteria, and matching music mood with motion intensity alignment criteria.

25. A computer-readable medium as recited in claim 21, wherein the instructions for aligning further comprise instructions for changing lengths of one or more sub-shots so that corresponding sub-shot and sub-music lengths are substantially the same.

26. A computer-readable medium as recited in claim 21, wherein aligning is performed such that a sentence having a beginning and an end is not clipped, the sentence being detected in one or more sub-shots of the particular ones.

27. A computer-readable medium as recited in claim 21, wherein the instructions for matching further comprise instructions for determining the respective moods according to:

$$\rho(m, v, \theta) = \rho(mood, motion^{(\theta)})$$
$$= \frac{E\left((mood - \overline{mood})(motion^{(\theta)} - \overline{motion^{(\theta)}})\right)}{\sqrt{D(mood)}\sqrt{D(motion^{(\theta)})}}; \text{ and}$$

wherein E(x) and D(x) respectively denote mean and variance values of sequence x, superscript θ representing a corresponding sequence that comprises a selected sub-sequence of an original sequence.

28. A computer-readable medium as recited in claim 21, wherein the instructions for matching further comprise instructions for selecting the particular ones via use of mean deviation instead of entropy to measure distribution uniformity.

29. A computer-readable medium as recited in claim 21, wherein the instructions for matching further comprise instructions for selecting the particular ones such that they are uniformly distributed according to:

$$H(m, v, x) = k_1\left[-\frac{1}{\log K^{(SC)}}\sum_{i=0}^{K^{(SC)}-1} p_i \log p_i\right] +$$
$$k_2\left[-\frac{1}{\log K^{(SH)}}\sum_{j=0}^{K^{(SH)}-1} q_j \log q_j\right],$$

wherein $$p_i = \frac{\sum_{M_i^{(SC)}}^{M_{i+1}^{(SC)}-1} x_i}{M}, M_i^{(SC)} = |\{s \in SC, s < i\}|,$$

$$q_j = \frac{\sum_{M_j^{(SH)}}^{M_{j+1}^{(SH)}-1} x_j}{M}, M_j^{(SH)} = |\{s \in SH, s < j\}|, \text{ and}$$

wherein |•| denotes number of elements in a finite set.

30. A computer-readable medium as recited in claim 21, wherein the instructions for matching further comprise instructions for selecting the particular ones according to:

$$\min F(m, v, x) = \alpha\rho + \beta I + \gamma H \text{ s.t.} \sum_{i=0}^{N-1} x_i = M, x_i \in \{0, 1\}.$$

31. A computer-readable medium as recited in claim 21, wherein the instructions for matching further comprise instructions for:
calculating respective importance measures for at least a portion of the sub-shots, each of the respective importance measures being based on corresponding sub-shot color entropy and camera motion type and speed; and
wherein the particular ones have respectively higher importance values as compared to sub-shots that are not one of the particular ones.

32. A computer-readable medium as recited in claim 31, wherein each of the respective importance measures are further based on whether speech was detected in the corresponding sub-shot.

33. A computer-readable medium as recited in claim 21, wherein the instructions for fusing further comprise generating a transition between two of the particular ones, the transition being based on a similarity of the two, the transition having a length.

34. A computer-readable medium as recited in claim 33, wherein the length is based on strength of beat in a corresponding sub-music of the sub-musics.

35. A computer-readable medium as recited in claim 21, wherein the video data sequence comprises video frames, and wherein after extracting and before matching, the method further comprises:
detecting visual quality of the video frames and/or sub-shots; and
dropping low-quality video frames and/or sub-shots to leave substantially higher quality video frames and/or sub-shots.

36. A computer-readable medium as recited in claim 35, wherein the dropped frames and/or sub-shots comprise a dropped sequence of frames and/or sub-shots, and wherein low quality frames and/or sub-shots correspond to any combination of the following attributes: poor color-entropy and abnormal motion analysis results.

37. A computer-readable medium as recited in claim 21, wherein the instructions for matching further comprise instructions for selecting the particular ones such that they are uniformly distributed across a scene and/or a shot composed of multiple ones of the particular ones.

38. A computer-readable medium as recited in claim 37, wherein the instructions for selecting the particular ones such that they are uniformly distributed across the scene is based on the following:

$$H^{(SC)}(m, v, \theta) = H(SC^{(\theta)})$$
$$= -\frac{1}{\log K^{(SC)}} \sum_{i=0}^{K^{(SC)}-1} p_i \log p_i$$

where $p_i = \frac{\text{\# of selected subshot in Scene}_i}{M}$.

39. A computer-readable medium as recited in claim 37, wherein the instructions for selecting the particular ones such that they are uniformly distributed across the shot is based on the following:

$$H^{(SH)}(m,v,\theta)=H(SH^{(\theta)}).$$

40. A computing device for editing a video data sequence with respect to an independent music source, the computing device comprising:
 a processor; and
 a memory coupled to the processor, the memory comprising computer-program instructions executable by the processor for:
  extracting metadata from the video data sequence and the independent music source, the metadata comprising sub-shots and sub-musics;
  calculating importance measures for at least a portion of the sub-shots;
  identifying particular ones of the portion that have relatively higher importance measures as compared to importance measures of other sub-shots;
  calculating respective moods for each of the sub-musics based on respective sub-music beats;
  matching respective sub-shot motion intensities to the respective moods to identify particular ones of the sub-shots to align and fuse with the independent music source;
  aligning the particular ones with corresponding sub-musics such that the particular ones are uniformly distributed across shots and/or scenes represented by the particular ones; and
  fusing aligned sub-shots with corresponding sub-musics to generate an auto-edited video.

41. A computing device as recited in claim 40, wherein aligning is based on sub-shot boundary and music beat alignment criteria, sub-shot boundary and sentence alignment criteria, and matching music mood with motion intensity alignment criteria.

42. A computing device as recited in claim 40, wherein the instructions for aligning further comprise instructions for changing lengths, while not clipping detected sentences, of one or more sub-shots so that corresponding sub-shot and sub-music lengths are substantially the same.

43. A computing device as recited in claim 40, wherein the instructions for matching further comprise instructions for determining the respective moods according to:

$$\rho(m, v, \theta) = \rho(mood, motion^{(\theta)})$$
$$= \frac{E\big((mood - \overline{mood})(motion^{(\theta)} - \overline{motion^{(\theta)}})\big)}{\sqrt{D(mood)} \sqrt{D(motion^{(\theta)})}}; \text{ and}$$

wherein E(x) and D(x) respectively denote mean and variance values of sequence x, superscript θ representing a corresponding sequence that comprises a selected sub-sequence of an original sequence.

44. A computing device as recited in claim 40, wherein the instructions for matching further comprise instructions for selecting the particular ones via use of mean deviation instead of entropy to measure distribution uniformity.

45. A computing device as recited in claim 40, wherein the instructions for matching further comprise instructions for selecting the particular ones according to:

$$\min F(m, v, x) = \alpha \rho + \beta I + \gamma H \text{ s.t.} \sum_{i=0}^{N-1} x_i = M, x_i \in \{0, 1\}.$$

46. A computing device as recited in claim 40, wherein the instructions for matching further comprise instructions for:
 calculating respective importance measures for at least a portion of the sub-shots, each of the respective importance measures being based on corresponding sub-shot color entropy and camera motion type and speed; and
 wherein the particular ones have respectively higher importance values as compared to sub-shots that are not one of the particular ones.

47. A computing device as recited in claim 46, wherein each of the respective importance measures are further based on whether speech was detected in the corresponding sub-shot.

48. A computing device as recited in claim 40, wherein the instructions for fusing further comprise generating a transition between two of the particular ones, the transition being based on a similarity of the two, the transition having a length.

49. A computing device as recited in claim 48, wherein the length is based on strength of beat in a corresponding sub-music of the sub-musics.

50. A computing device as recited in claim 40, wherein the instructions for matching further comprise instructions for selecting the particular ones such that they are uniformly distributed across a scene and/or a shot composed of multiple ones of the particular ones.

51. A computing device as recited in claim 50, wherein the instructions for selecting the particular ones such that they are uniformly distributed across the shot is based on the following equation:

$$H^{(SH)}(m,v,\theta)=H(SH^{(\theta)}).$$

52. A computing device as recited in claim 40, wherein the video data sequence comprises video frames, and wherein after extracting and before matching, the computer-program instructions further comprise instructions for:
 detecting visual quality of the video frames and/or sub-shots; and
 dropping low-quality video frames and/or sub-shots to leave substantially higher quality video frames and/or sub-shots.

53. A computing device as recited in claim 52, wherein dropped frames and/or sub-shots comprise a dropped sequence of frames and/or sub-shots, and wherein low quality frames and/or sub-shots correspond to any combination of the following attributes: poor color-entropy and abnormal motion analysis results.

54. A computing device for editing a video data sequence with respect to an independent music source, the computing device comprising:

means for extracting metadata from the video data sequence and the independent music source, the metadata comprising sub-shots and sub-musics;

means for calculating importance measures for at least a portion of the sub-shots;

means for identifying particular ones of the portion that have relatively higher importance measures as compared to importance measures of other sub-shots;

means for calculating respective moods for each of the sub-musics based on respective sub-music beats;

means for matching respective sub-shot motion intensities to the respective moods to identify particular ones of the sub-shots to align and fuse with the independent music source;

means for aligning the particular ones with corresponding sub-musics such that the particular ones are uniformly distributed across shots and/or scenes represented by the particular ones; and means for fusing aligned sub-shots with corresponding sub-musics to generate an auto-edited video.

\* \* \* \* \*